Patented Oct. 30, 1928.

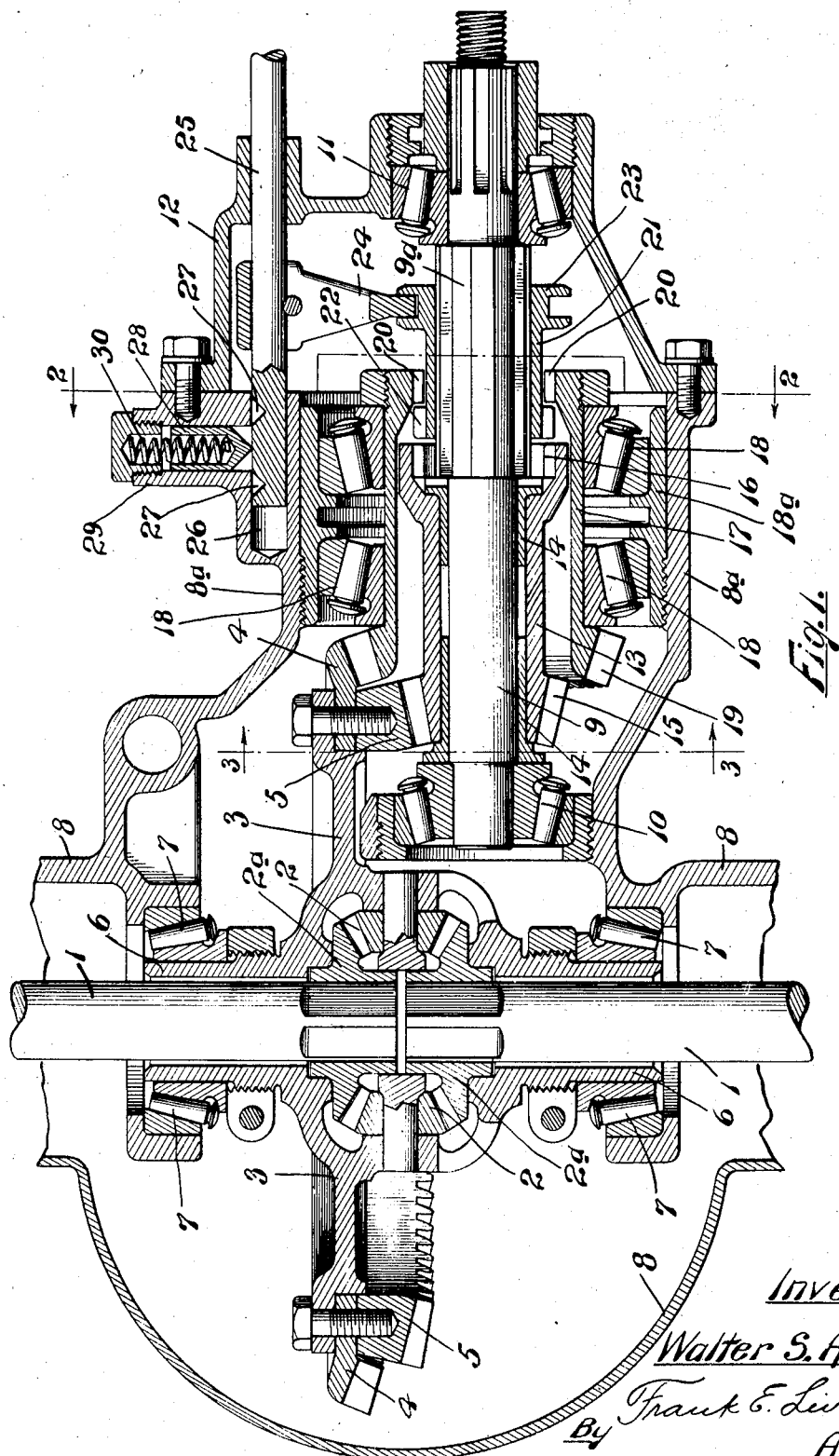

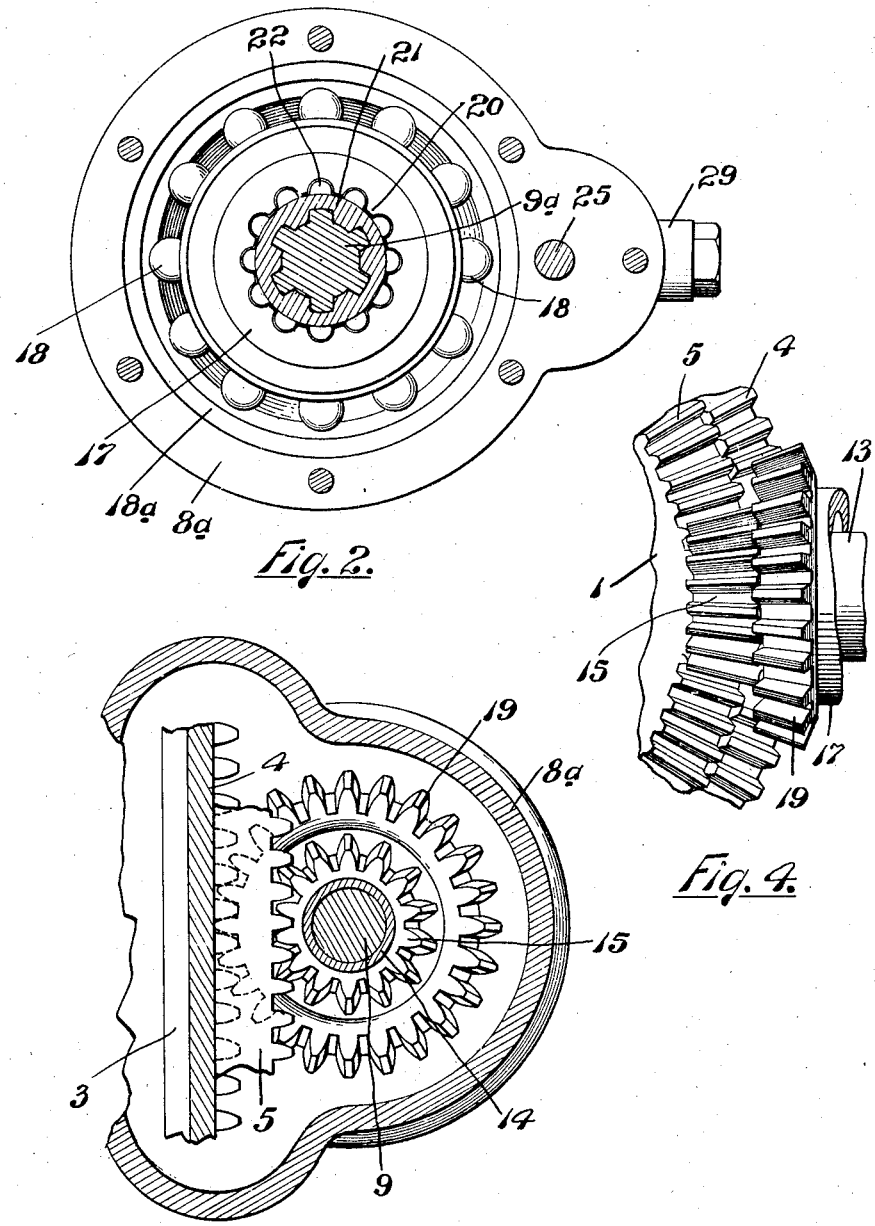

1,689,377

UNITED STATES PATENT OFFICE.

WALTER S. AUSTIN, OF GRAND RAPIDS, MICHIGAN.

TWO-SPEED AXLE-GEARING CONSTRUCTION.

Application filed June 14, 1920, Serial No. 388,801. Renewed February 27, 1926.

This invention relates to a gearing construction particularly adapted for motor vehicle use and one which may be interposed between the drive shaft and rear axle of the vehicle to drive said rear axle from the drive shaft at two different speeds relative to the drive shaft. One of these speeds, which may be designated the low speed drive is of the ordinary character common to practically all automobiles and adopted by manufacturers of automobiles for handling the car in connection with the usual change speed gearing placed between the engine and drive shaft, under the varying road conditions which may be met with, and particularly the ratio between the drive shaft and the rear axle must be high enough so that too heavy labor will not be imposed on the engine when the roads are in very bad condition. This makes such drive ratio imperfect when favorable road conditions are met with, and in my invention there is provided a second connection between the drive shaft and the rear axle, which may be designated the high speed drive, in which the ratio between the rotation of the drive shaft and said rear axle is lower, this speed being for use when the car is going over roads in good condition. It is a primary object and purpose of the present invention to construct a greatly simplified two-speed axle gearing construction, one in which the weight is greatly reduced, and one to which access may be very easily and readily had, thus greatly simplifying the assembling operations as well as aiding in case repairs need to be made thereto, the improvements made still leaving a construction having all the advantages and functions present in the construction shown in my Patent No. 1,091,618, granted March 31, 1914, together with many others resulting from said simplifying and weight reduction.

For an understanding of the invention and the construction by means of which these results, as well as many others not at this point specifically enumerated, are attained, reference may be had to the following description taken in connection with the accompanying drawings, in which, Fig. 1 is a horizontal section taken through the two-speed axle gearing and the adjacent differential and rear axle construction with which it is associated.

Figs. 2 and 3 are transverse sections taken on the lines 2—2, and 3—3, respectively of Fig. 1 and looking in the directions indicated by the arrows, and Fig. 4 is a fragmentary side elevation showing the connection of the two driving pinions with the two ring gears forming a part of the construction.

Like reference characters refer to like parts in the different figures of the drawings.

The two halves or parts 1 of the rear axle, shown fragmentarily in Fig. 1, have bevelled pinions $2^a$ fixed on their adjacent ends, the same meshing with beveled pinions 2 loosely mounted on a plate 3, this being a common differential gearing construction. The plate 3 is of circular outline and carries two ring gears 4 and 5, the latter being of smaller diameter than the former. Each is provided with a consecutive series of bevelled gear teeth and the ring 5 lies against an inwardly extending flange formed integral with the ring 4. Securing screws pass through the plate 3, the flange of ring 4 and into the ring 5 as shown to firmly secure the ring gears in place. Sleeves 6 formed integral with the plate 3 and projecting in opposite directions therefrom loosely receive the inner ends of the rear axle parts 1 and the ends of the sleeves are mounted in bearings 7 in turn carried in suitable supports formed with the differential housing 8 which, together with its forward integral extension $8^a$ houses the differential gearing and the two-speed axle gearing associated therewith.

A shaft 9 is located within and lengthwise of the forward extension $8^a$ of the housing, being mounted at its rear end in a bearing 10 and at its front end in a similar bearing 11 carried by a head or cap 12 which closes the front end of the housing, being detachably secured to the housing by the usual cap screws. At its front end shaft 9 is designed to be attached to the main portion of the drive shaft, any suitable type of universal joint connection being used. The shaft 9 is in reality an extension or section of the drive shaft and is driven by the engine of the vehicle, either directly or through the various gears of a speed changing mechanism.

A sleeve 13 is loosely mounted on the shaft 9, bearings 14 being placed between the sleeve and shaft, one of which bearings is located directly in front of the rear bearing 10 for the shaft and the other back of an intermediate splined portion $9^a$ of the shaft. At its rear end the sleeve is formed with a pinion 15 which is in mesh with the gear 5. At its front end said sleeve is enlarged and on its side provided with a series of clutch teeth 16.

A second sleeve 17 is placed around the front portion of the first sleeve 13, being large enough to be entirely out of contact with the inner sleeve and rotatably mounted in a pair of outside bearings 18 carried in a cage 18ᵃ which is detachably secured to and inside of the housing extension 8ᵃ. At its rear end this sleeve is provided with a pinion 19 in mesh with the ring gear 4 and at its front end beyond the end of the inner sleeve 13 with a series of clutch teeth 20, the front end of the sleeve being thickened so that the clutch teeth at 20 and at 16 are of the same size and the same number are used.

On the intermediate section 9ᵃ of shaft 9, a third sleeve 21 is splined, being formed at its rear end with a series of clutch teeth 22 and at its front end with a collar 23. The sleeve may occupy three positions, one in which its rear clutch portion is in engagement with the clutch teeth 16 of sleeve 13, another in which such engagement is with the clutch of the outer sleeve 17 and the third an intermediate position in which it is free from engagement with both. In practice, it is designed that the sleeve 21 shall be connected with either one or the other of sleeves 13 and 17, the intermediate neutral position being merely a point in the movement of the sleeve 21 where it is connected with neither.

An arm 24 having connection at one end with collar 23 is connected at its other end to a rod 25 passing forwardly through the cap 12 and received at its rear end in a guide recess 26 bored in an enlargement of one side of the housing portion 8ᵃ. The rear end of rod 25 has two spaced apart notches or recesses 27 with which a latch bolt 28 is adapted to engage. The bolt is loosely mounted in a boss 29 cast integral with the housing and is spring actuated against the rod 25 by a spring 30 as shown. The bolt holds the rod 25 in either of two positions against aimless movement or accidental change of position, but yields on the application of a moderate amount of force so that rod 25 may be readily moved from one position to the other and thus move the sleeve 21 into operative connection with either of sleeves 13 or 17. Preferably, the rod 25 is at a side of the drive shaft and the housing, but this is not essential, nor it is a distinguishing feature of the invention.

When the sleeve 21 is connected with the inner sleeve 13, and shaft 9 driven by the engine, the rear axle is driven through pinion 15 and gear 5. When engaged with the outer sleeve 17 the drive of the rear axle is through pinion 19 and gear 4. The first is the low speed drive and the latter the high speed drive, as the pinion 15 is so much relatively smaller than pinion 19 that the fact that gear 5 is smaller than gear 4 does not make any very material difference. The shifting from one speed to the other is accomplished by longitudinal movement of the rod 25 which may be operated from the forward part of the vehicle.

It will be noted that this construction provides an assembly of all necessary elements in very small space, reducing the size and weight materially. This is very important in motor vehicles as the cutting down of weight of mechanism carried on the rear axle housing is in accordance with the accepted principles of motor vehicle design, any excess unsprung weight being detrimental and very costly, particularly to the effective life and running of the vehicle. It will further be noted that with this construction, all of the parts are readily removable. The closing cap 12 may be removed and all of the bearings, sleeves, shaft and clutch actuating mechanism thereafter taken out very readily. Similarly the same may be as readily replaced so that the assembly in the first instance is easy and the keeping in repair likewise is easy. The construction is thoroughly practical and efficient and combines all of the advantages of the construction shown in my patent above mentioned with the added advantages enumerated.

Various changes in minor detail of construction may be made in the construction without departing from the invention defined in the appended claims and I consider myself entitled to all such differing constructions as fall within the scope of said claims.

I claim:

1. In a change speed gearing for motor vehicles, the combination of a rear axle and differential gearing, a housing enclosing the same and having a forward extension, a cap detachably secured to the front end of and closing said front end of said extension, an inner and an outer bevelled gear located in the housing around the differential gearing and operatively connected therewith to drive the rear axle, a drive shaft located within the housing extension and having a bearing in the closing cap, an inner sleeve mounted on the drive shaft, an outer sleeve mounted in bearings carried by the housing, means to selectively couple the shaft with either sleeve, and pinions on the inner and outer sleeves in mesh with the inner and outer bevelled gears, respectively, said shaft, sleeves and bearings therefor being detachably mounted for ready removal from the housing on removal of the detachable front closing cap, substantially as and for the purposes described.

2. In a change speed gearing for motor vehicles, the combination of the rear axle, differential gearing and casing therefor, of an inner and an outer bevelled gear connected to said casing for driving the rear axle through the differential gearing, a housing for the axle, gears and differential gearing, said housing having an integral forward extension open at its front end, a cap detachably connected to said forward extension to close its front end, a drive shaft extending into the housing having a bearing in said cap and a bearing at its rear end carried by said housing, both of said bearings being removably mounted, an inner sleeve mounted on the shaft, an outer sleeve mounted in bearings removably mounted on and within the integral extension of the housing and extending in front of the inner sleeve, a beveled pinion at the rear end of each sleeve, said pinions meshing with the gears, a third sleeve splined on the drive shaft and projecting into the extension of the outer sleeve, coacting clutch elements on the third sleeve and each of the first mentioned sleeves, and operating means connected with the third sleeve and adapted to move said sleeve to selectively effect connection thereof with either of said first mentioned sleeves, said operating means being likewise detachably mounted for removal on removal of said closing cap, substantially as described.

3. In a change speed gearing for motor vehicles, the combination of a rear axle and differential gearing, a housing enclosing the same and having a forward extension, a cap detachably secured to the front end of and closing said front end of the extension, an inner smaller bevelled gear and an outer larger bevelled gear on the rear axle, a propeller shaft, smaller and larger beveled pinions on the propeller shaft meshing respectively with the smaller and larger bevelled gears on the axle, clutch elements, one for each pinion, a movable clutch member on the propeller shaft between the two clutch elements, moving forward to engage with one and rearwardly to engage with the other of the clutch elements, whereby selective connection is made, all of the clutch elements being in axial alignment, bearings for the pinions and propeller shaft, the said bearings, shaft and pinions being detachably mounted for removal from the housing on removal of the detachable cap.

4. In a change speed gearing, the combination of an axle, a drive shaft extending substantially at right angles thereto, a large beveled gear and a small beveled gear operatively connected to said axle to drive the same, two sleeves, one surrounding the other and both surrounding said drive shaft, the end of the inner sleeve farthest from the axle terminating within the outer sleeve, a pinion on each sleeve, the pinion on the inner sleeve meshing with the smaller gear and the pinion on the outer sleeve meshing with the larger gear, clutch members on each of said sleeves, the respective clutch members of each sleeve being spaced apart in an axial direction, a coupling member slidably and non-rotatably mounted on said drive shaft, clutch members on said coupling member adapted to be positioned in the space between the respective clutch members of each of said sleeves whereby movement of the coupling member toward the axle will engage the clutch members of the coupling member with the clutch members of the inner sleeve and movement of the coupling member away from the axle will engage the clutch members of the coupling member with the clutch members of the outer sleeves.

In testimony whereof I affix my signature.

WALTER S. AUSTIN.